United States Patent [19]

Haber et al.

[11] 4,435,766
[45] Mar. 6, 1984

[54] NESTED RESOURCE CONTROL USING LOCKING AND UNLOCKING ROUTINES WITH USE COUNTER FOR PLURAL PROCESSES

[75] Inventors: Judith G. Haber; Kenneth L. Jeffries; Paul J. Kilpatrick, all of Austin, Tex.

[73] Assignee: International Business Machines Corporation, Armonk, N.Y.

[21] Appl. No.: 274,113

[22] Filed: Jun. 16, 1981

[51] Int. Cl.³ .............................................. G06F 9/18
[52] U.S. Cl. .................................. 364/300; 364/200
[58] Field of Search ............... 364/200, 900 MS File, 364/300

[56] References Cited

U.S. PATENT DOCUMENTS

| | | | |
|---|---|---|---|
| 3,683,418 | 8/1972 | Martin | 364/300 |
| 4,096,561 | 6/1978 | Trinchieri | 364/200 |
| 4,249,241 | 2/1981 | Aberle et al. | 364/200 |

OTHER PUBLICATIONS

Bidwell et al., "Shared Storage Locking Facility", *IBM T. D. B.*, vol. 14, No. 5, Oct. 1971, pp. 1543–1544.

Primary Examiner—Raulfe B. Zache
Attorney, Agent, or Firm—Andrea P. Bryant

[57] ABSTRACT

A mechanism allowing nested resource locks among a plurality of related programs is provided by means of a lock counter which is incremented and decremented as programs LOCK and UNLOCK a resource but the resource is not released until a count is zero. A separate LOCK counter is provided for each resource in the system.

8 Claims, 7 Drawing Figures

NESTED RESOURCE CONTROL USING LOCKING AND UNLOCKING ROUTINES WITH USE COUNTER FOR PLURAL PROCESSES

DESCRIPTION

1. Technical Field

The present invention relates to resource allocation in a multi-processing environment. More particularly, it relates to a mechanism for serialization of access to a resource which may be shared by two or more processes without jeopardizing the integrity of that resource.

2. Background Art

The present invention represents an improvement in information processing systems wherein a plurality of tasks may require the same resource. The invention will, however, be described as embodied in a processor based word processing system. Those skilled in the art will, of course, appreciate the parallels between resource allocation management techniques in large and small systems.

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which will appear in the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the processor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally stored on the diskette. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key while moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, and moving a word from one position on the line to a different position.

At a more detailed level, the software used by and with the microprocessor in a system such as that above described is functionally divided into, inter alia, many operator selectable applications or tasks. Examples of such applications include text entry, text revision, spelling verification, and background printing. Each of these applications selected for example, by a single keystroke to so indicate a menu choice, causes a great amount of activity in the microprocessor based system, all of which is transparent to the operator. That activity is initiated and performed by one or, most likely, many processes. A process is the dispatchable entity in the system where the present invention is used. A process is a functional unit comprising a stack area, a set of programs and a process control block. Many programs or routines may operate under a single process.

It may be that any one or more programs or routines operating under a single process may seek control of a single resource. Examples of resources as used in the instant application as I/O devices, control blocks, sequence of instructions, etc. It is known in a traditional system to allow the same process, more than one program or routine, to issue locks for the same resource. However, the resource would be freed on the first release request given by that process. A problem is presented when a routine has a lock on the resource and then calls a subroutine and the subroutine needs access to that previously locked resource. Early attempts to solve this problem led to consumming more storage area for code to test the status of the resource and communicate the test results to the subroutine.

The present invention overcomes this problem in the prior art and reduces the amount of information which needs to be communicated on this type of subroutine call by providing LOCKing and UNLOCKing routines to support nesting of lock requests. That is, within a single process when the first LOCK request is granted a resource use counter is set to one and each succeeding lock request issued by a routine within the original process causes the resource use counter to be incremented by one. As the calling routines issue UNLOCK or release requests the resource use counter is decremented until it is zero, which means it is no longer locked and available to be locked by another process.

DISCLOSURE OF THE INVENTION

A lock control block LCB is defined for and associated by convention with each shared resource in the system. A LOCK routine is used to request exclusive access to the resource. If a resource is available, that is, its lock count LCKCNT is zero, the ID of the process PID issuing the LOCK is stored in the LCB field RPID. The lock count LCKCNT in the LCB is then set to one. The capability of nesting lock requests for the same resource by the same process is permitted as a result of the present invention. The lock count LCKCNT associated with the resource is incremented by one for each nested lock request.

If the resource is not available, that is the lock count LCKCNT is not zero and the process ID PID in the LCB field RPID does not match that of the process issuing the LOCK, the process issuing the LOCK is removed from the ready list. The PCB of that process is chained onto a queue of PCBs which have issued LOCKs for the same resource and are waiting for the resource to become available. The field RLNK in the LCB points to the first PCB in the chain of waiting processes or contains zero if no processes are waiting for this resource. This queue is ordered by the relative priorities of the waiting processes on the queue.

The UNLOCK routine is used to decrement the lock count LCKNT in the LCB for that resource. If the lock count LCKCNT goes to zero and no process is waiting for that resource then the resource is released. If one or more processes are waiting for the resource to become available, the first process control block on the queue of PCBs waiting for that resource is removed from the queue. That process is added to the ready list and is granted exclusive access to the resource. The ID of that process is stored in the LCB field RPID, and the lock count LCKCNT in the LCB is set to one.

A preferred embodiment of our invention will be described having reference to the accompanying drawings wherein the same reference numerals are used to denote the same element.

DESCRIPTION OF THE INVENTION

Figure 1:
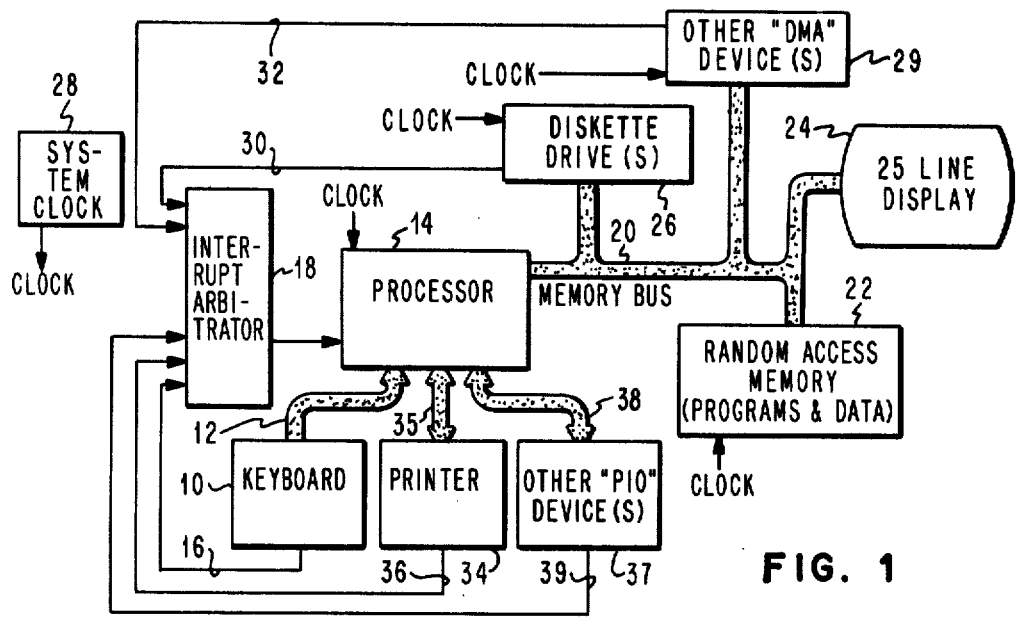
FIG. 1 is a block diagram of a word processing system utilizing the present invention.

The invention will now be described as embodied in an interactive text processing system of the type shown in FIG. 1. Referring to FIG. 1, a block diagram of a word processing system implementing the present invention is illustrated. A keyboard 10 is provided for inputting graphic characters, data and instructions to the word processing system. The graphic characters, data and instructions from the keyboard 10 are applied through a data bus 12 to the system. Processor 14 may be implemented by a commerically available microprocessor, such as the Intel Corporation's 8086 processor. The Intel 8086 processor executes on one level with one set of registers.

The keyboard 10 also applies a hardware interrupt signal via interrupt line 16 to an interrupt arbitrator 18. The 8259-A Interrupt Controller was selected to implement the interrupt arbitrator 18 to resolve interrupt requests from the incoming interrupt lines. The 8259-A Interrupt Controller may resolve interrupt requests from up to eight interrupt lines into eight priority levels for the 8086 processor 14. While the interrupt arbitrator 18 illustrated in FIG. 1 receives only five hardware interrupt signals, the word processing system may include additional hardware interrupts. The 8259-A Interrupt Controller may accommodate interrupt lines for up to eight hardware levels, each hardware interrupt having assigned to it a priority code. Interrupt Service Processes ISPs correspond to each of the hardware interrupts and are dispatched by the system to service that interrupt. While the ISP is dispatched, interrupts at the same or higher priority level are masked out thus ensuring proper scheduling of the processor 14 for interrupt servicing.

The processor 14 performs the various control functions necessary for the word processing system to process, edit and display data. The processor 14 is connected by a memory bus 20 to a random access memory RAM 22 for storing system data and programs. A visual display 24 is also connected by the memory bus 20 to the processor 14 for displaying data and information for enabling communication between the system and an operator of the system. A diskette drive 26 driven by the system clock 28 is also connected through the memory bus 20 to the processor 14. The diskette drive 26 comprises means for accessing the system programs. System programs are contained in program libraries on the diskettes. Modules from the program library may be loaded or deleted from RAM. The word processing system may include other direct memory access (DMA) devices 29 connected via the memory bus 20 to the processor 14. The diskette drives 26 and other DMA devices 29 provide hardware interrupt signals on interrupt lines 30 and 32, respectively, to the input arbitrator 18.

A printer 34 communicates via an output data bus 35 with the processor 14 for providing a printed record of keyboard entered data or instructions from the system. The printer 34 provides another hardware interrupt signal via interrupt signal line 36 to the input arbitrator 18. Other processor input/output devices 37 may also be provided as part of the system. The processor input/output devices 37 may communicate via an output data bus 38 to the process 14 and provide a hardware interrupt signal via interrupt signal line 39 to the interrupt arbitrator 18.

Figure 2:
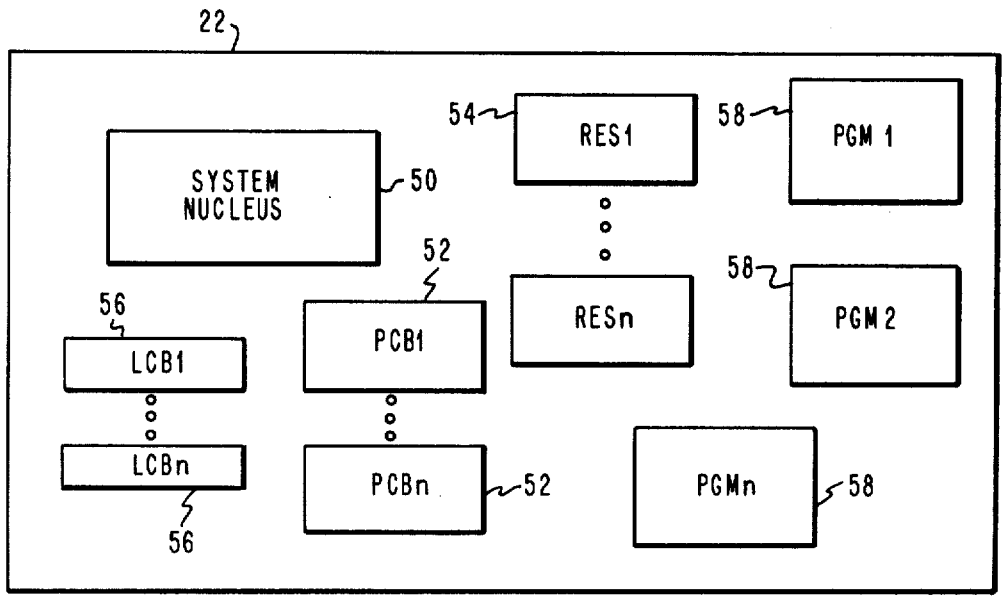
FIG. 2 is a schematic diagram of memory 22 in FIG. 1.

FIG. 2 schematically illustrates RAM 22 contents as related to the present invention. Indicated generally at 50 is the system nucleus which comprises a set of routines used in controlling the word processing system in which the present invention is embodied. Indicated at 52 is a series of process control blocks with the IDs PCB1 through PCBn. Each process in the system has its own process control block PCB with information of the type to be described with reference to FIG. 3, information such as the ID by which the system addresses a process, its associated memory area and a link field and the status. A series of lock control blocks LCB 56 which contain entries useful in monitoring the status of resource availabilities will be discussed further with reference to FIG. 4. Also present in RAM 22 are resources schematically illustrated as resource 1 to resource N, (RES1 ... RESn) indicated generally at 54. At 58 are a plurality of programs PGM1 to PGMn which are associated with particular processes.

Figure 3:
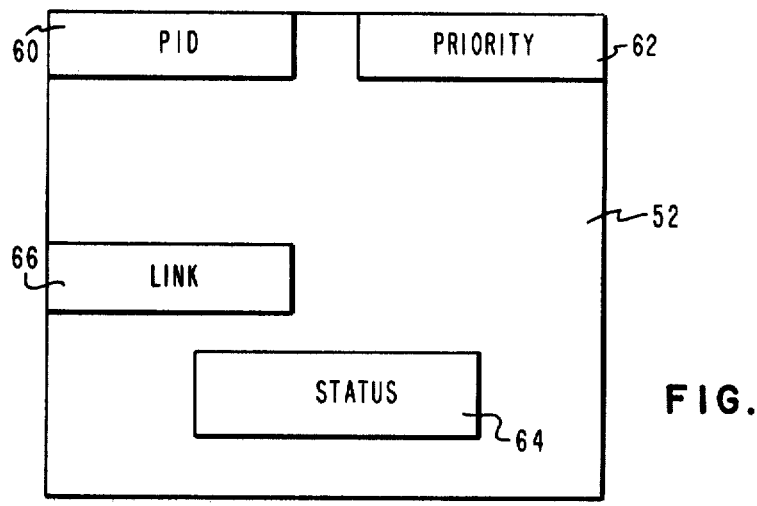
FIG. 3 is a more detailed illustration of the contents of the process control block.

FIG. 3 schematically illustrates pertinent fields of a process control block 52 from FIG. 2. The ID field at 60 which may be conveniently thought of as a PID is provided in each process control block and is the name by which the system addresses the process control block. A priority field 62 contains the priority level for this process. In an interrupt driven environment such as an interactive word processing system processes are assigned a dispatching priority for use in giving control of the processor 14 from FIG. 1. The status field 64 contains status information such as ready, waiting, and loaded. As far as serializing access to a resource is concerned, the link field 66 performs a special function which will become clear in connection with FIG. 4.

Figure 4:
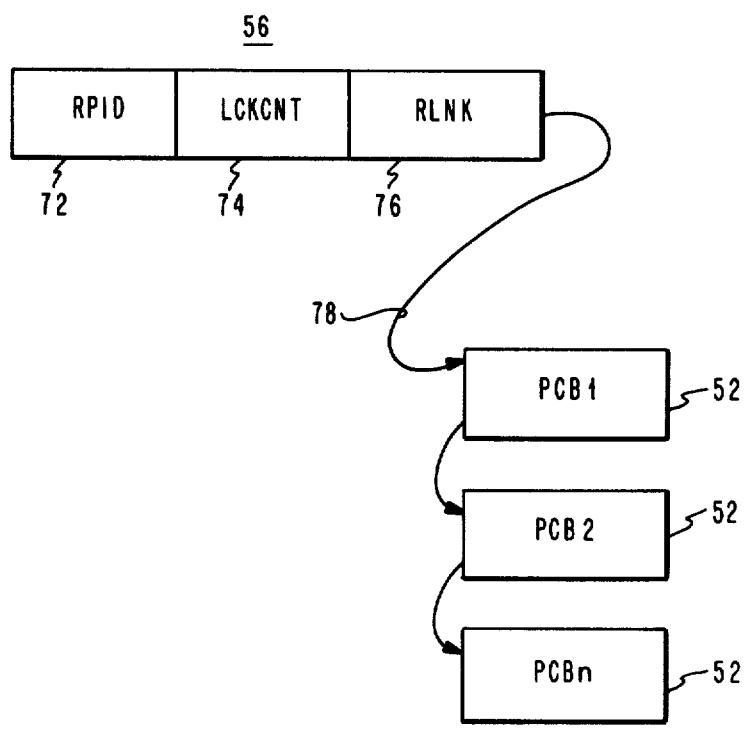
FIG. 4 is a diagram of a lock control block.

FIG. 4 shows schematically the fields in a lock control block LCB 56, first shown in FIG. 2. Each shared resource in the system is associated with a lock control block. If no process has LOCKed the resource, the process ID field RPID would contain zero. Lock count LCKCNT field 74 is zero meaning that the associated resource is available. If some process has LOCKed the resource, the process ID field RPID will contain the PID of that process and the lock count field LCKCNT will contain some positive integer. Field 76 contains the address of the process control block which is first in a chain of such process control blocks, which process may be waiting to lock on the resource. Process control blocks 52 are chained together as indicated by arrow 78. The chaining field is the link field 66 shown in FIG. 3. That is, the LCB entry for the LOCKed resource contains, in its link field RLNK a pointer to the next process control block in the chain. Each process link field (66, FIG. 3) likewise contains a pointer to the next PCB in this wait queue.

Figure 5:
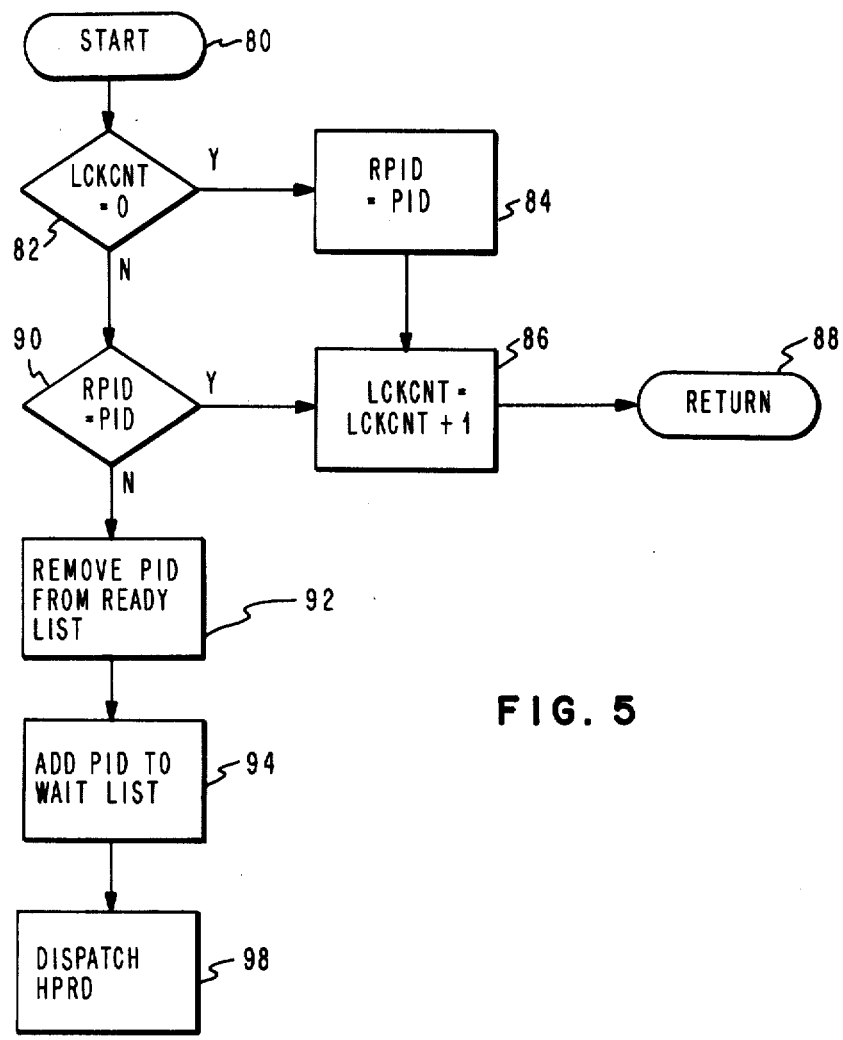
FIG. 5 is a flow diagram of the operation performed by a lock routine.

FIG. 5 illustrates a function performed within the system nucleus when a process or routine operating under a process attempts to LOCK a particular resource. The routine starts at entry point 80. The system nucleus first determines at step 82 whether the lock count LCKCNT field (74 in FIG. 4) is zero. If so, then at step 84 the ID of the process seeking the lock PID is placed into the lock control block RPID field 72. Then at step 86 the lock count LCKCNT field 74 is incremented by one indicating that the particular resource is indeed LOCKed. Control is returned at exit point 88 to the process that requested the lock. Returning to test 82, if the lock count LCKCNT is not zero, meaning that the resource was already LOCKed, the process ID of the process seeking to LOCK is compared with the ID 72 in the lock control block to determine if this process is the same process at test 90. If it is the same process ID, then lock count LCKCNT is incremented by one at step 86 and control is returned as before via return 88. If the process IDs tested at step 90 do not match, then the process requesting the LOCK is removed from the ready list at step 92 and is inserted into the list of processes waiting for this resource at step 94. The link field RLNK in the LCB is used to point to the first process PCB in the list of waiting processes. If this field RLNK contains zero, no processes are waiting for this resource. Since the process requesting the LOCK is no longer ready, the system nucleus at step 98 dispatches the new highest priority ready process.

Figure 6:
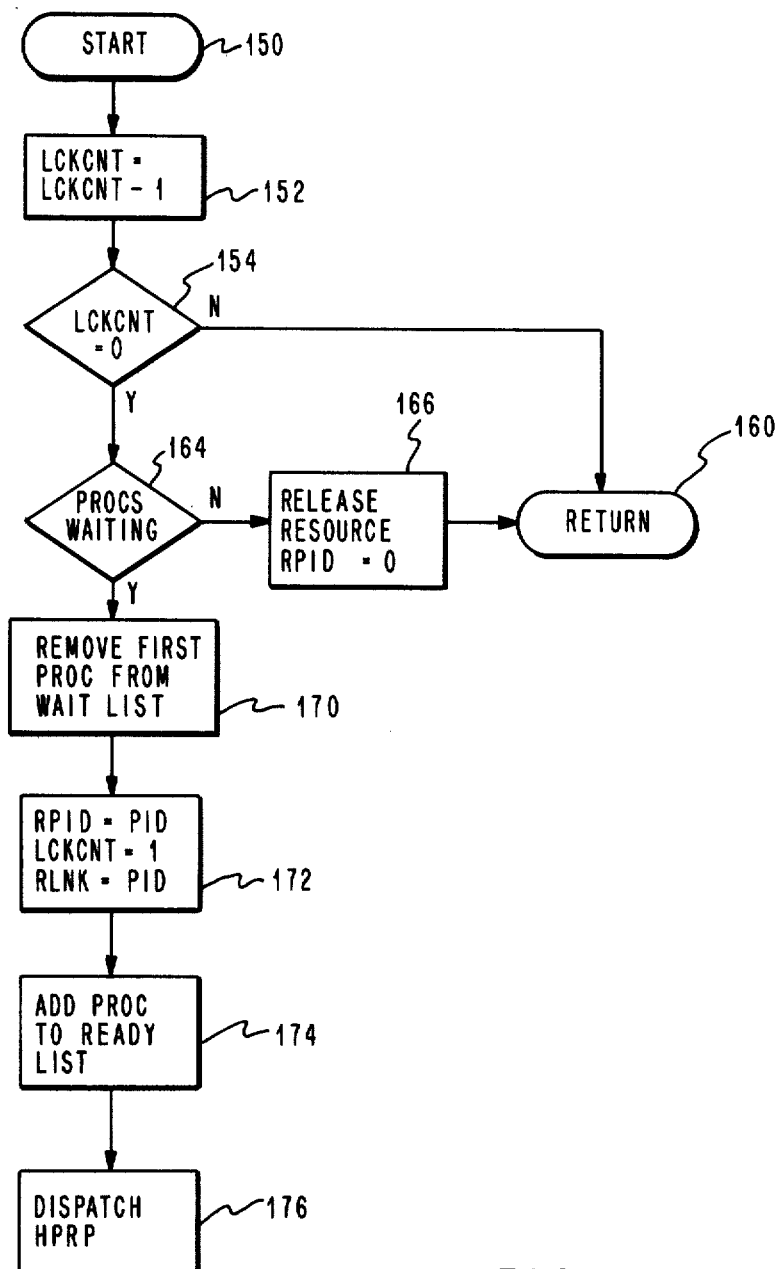
FIG. 6 is a flow diagram of the process performed by the unlock routine.

FIG. 6 is a flow diagram of the functions performed by the system nucleus when a process or routine within a process seeks to release or UNLOCK a resource. The routine assumes control at the start point 150. The first step performed at 152 is to decrement the lock count LCKCNT by one. Test 154 determines whether the newly decremented lock count LCKCNT is now zero. If the lock count LCKCNT is still greater than zero, the process still has a lock on the resource so that control may be returned at 160 to the UNLOCKING process. If lock count LCKCNT is zero then test 164 is performed to determine if there are processes waiting to LOCK this resource. If there are no waiting processes then the resource may be released at 166 by leaving the lock count LCKCNT equal zero and by clearing the process ID field, that is, RPID 72, in the lock control block as illustrated in FIG. 4 and control is returned to the UNLOCKing process at 160.

If there are processes waiting to LOCK the resource, then a sequence of steps beginning with 170 is performed. The first step is to remove the first process in the wait queue. The wait queue is a priority ordered queue. It wil be recalled that each process in its process control block, FIG. 3, has a field 62 containing its dispatching priority. The lock is granted at sequence 172 which includes taking the process ID PID of the process just removed from the wait queue and placing it in the resource process ID RPID field. Lock count LCKCNT is set to one and the link field of the resource RLNK gets the process ID of the next process in the queue. At step 174, the process removed from the wait queue is added to the ready queue. At 176, the system nucleus dispatches the highest priority ready process.

The need for serialization in a multi-tasking system is obvious to those skilled in the art. Without some technique for serialization, situations could arise in which one routine which accesses a data structure is subject to an interrupt by another routine which accesses the same data structure and changes a value which the first routine uses when it again accesses the data set. Because of the intervening action by the second routine, the first routine achieves erroneous results. Lock use counters are known. In the present invention, however, a nesting capability is provided which allows the same process or routines within that process to lock onto a resource and keep the lock until the entire nest is finished with the resource.

Figure 7:
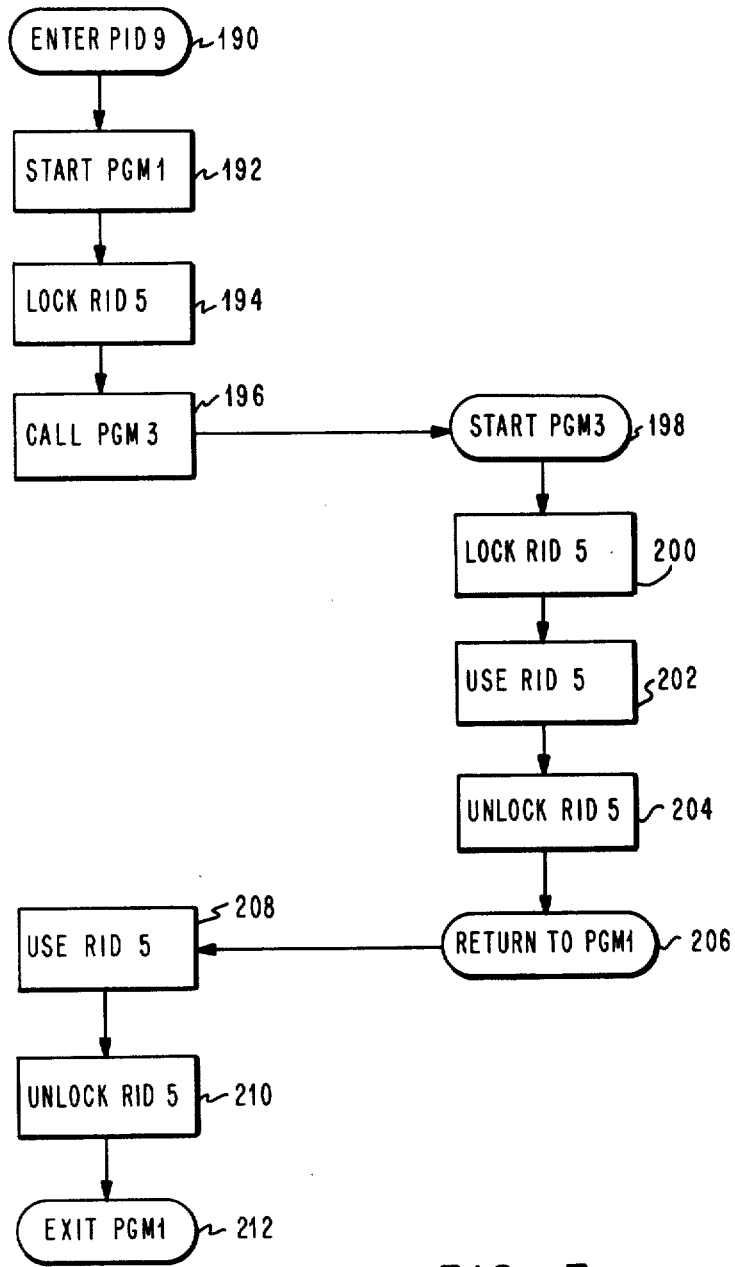
FIG. 7 schematically illustrates an example of the use of the present invention.

It will be recalled that the system in which the present invention is implemented is a multi-processing system and within each process several programs or routines may execute. Refer now to FIG. 7 for an explanation of an exemplary use of the present invention. In FIG. 7 at entry point 190 the process having the ID PID9 is in control of the processor (14 of FIG. 1). At some point, program 1 PGM1 was started as represented by block 192. At some point during its execution, PGM1 as shown at 194, took the step of LOCKing the resource having the ID RID5. This step proceeds in accordance with FIG. 5. PGM1 then calls PGM3 at step 196. As shown at 198, the program PGM3 starts. Sometime during its execution PGM3 at step 200 LOCKs RID5. Again, step 200 represents the execution of the routine illustrated in FIG. 5. Because PGM3 has the same process ID, PID9, as PGM1 the routine in FIG. 5 will result in the LCKCNT field in the lock control block for RID5 being incremented by one. LCKCNT is now equal to 2.

PGM3 uses RID5 shown at step 202. At sequence 204, the UNLOCK routine is called by PGM3. As illustrated in FIG. 6 the lock count LCKCNT field of the LCB for RID5 will be decremented by one, but LCKCNT will still be greater than zero so that the UNLOCK routine returns control leaving the resource still LOCKed to PID9.

Returning to FIG. 7, PGM3 returns to PGM1 at sequence 206. At step 208 PGM1 uses RID5 and UNLOCKs at step 210. Now resource RID5 is available. If another process is waiting for resource RID5, the LOCK will be granted at this time. PGM1 ends at exit 212, While the invention has been shown and described with respect to a particular embodiment implemented on a particular microprocessor, obviously changes in form and detail, as occasioned by the choice of processor, may be made without departing from the scope of the invention.

We claim:

1. A method of controlling a process lock on a resource, said method comprising:
   nesting lock requests within a number of programs comprising a process;
   maintaining said process lock through incrementing and decrementing a use counter from the initial process lock, during execution of a program, and calling up other programs within said process until said use counter is restored to its initial state prior to releasing said initial process lock.

2. A method of serializing access to a resource by a plurality of programs belonging to a common process comprising the steps of:
   (a) defining a convention lock counter for association with a process;
   (b) incrementing said counter whenever one of the programs in the process requests a lock;
   (c) decrementing said counter whenever one of said programs requests an unlock; and
   (d) releasing said resource only when said convention lock counter is zero.

3. A system for providing serialized access to a resource by a plurality of related programs in a multi-tasking environment including:
   convention lock counter means associated with the resource;
   means associated with said convention lock counter for incrementing said counter whenever a program requests a lock;
   means associated with said convention lock counter for decrementing said counter whenever one of said programs requests an unlock; and
   means responsive to said programs and associated with said convention lock counter for releasing said resource for access by a program unrelated to the related programs only when said convention lock counter is zero.

4. The system of claim 3 further including means connected to said resource for establishing and maintaining a wait queue for programs unrelated to the related programs when said unrelated programs request a lock.

5. In a multi-tasking interactive environment system means for controlling allocation of a plurality of resources among a plurality of processes where each process may encompass a plurality of routines which can request locks on a resource including:
   control means for granting all requests for locks on a resource from one process before granting any requests from a different process.

6. The system of claim 5 wherein said control means for granting includes:
   lock counter means associated with each resource;
   means connected to the resource for incrementing the lock counter whenever any routine in a first process requests a lock;
   means connected to the resource for decrementing the lock counter whenever any routine in the first process requests an unlock;
   means associated with the resource for maintaining a wait list of any lock requesting routines not in the first process; and
   means associated with the resource for honoring the lock request of a routine in said wait list only when said lock counter is zero.

7. The system of claim 4 further including means associated with each routine for priority ordering said programs in said wait queue.

8. The system of claim 6 further including means associated with each routine for priority ordering the wait list.

* * * * *